United States Patent

Selvaggio

[15] 3,653,567

[45] Apr. 4, 1972

[54] PORTABLE KIT

[72] Inventor: Peter M. Selvaggio, 3965 Robertann Drive, Kettering, Ohio 45429

[22] Filed: Feb. 11, 1970

[21] Appl. No.: 10,355

[52] U.S. Cl.................................224/42.42 R, 190/41 R
[51] Int. Cl.........................................................B60m 11/00
[58] Field of Search............224/42.42 R, 42.11, 29, 42.42 A; 190/41 R, 61; 206/19.5

[56] References Cited

UNITED STATES PATENTS

| | | | |
|---|---|---|---|
| 3,394,849 | 7/1968 | Streeter | 224/42.42 X |
| 2,988,206 | 6/1961 | Olson | 224/29 |
| 3,136,461 | 6/1964 | Gregg, Jr. | 224/42.42 |
| 1,189,835 | 7/1916 | Labadie et al | 224/29 UX |
| 1,664,431 | 2/1926 | Ringer | 190/41 R X |

Primary Examiner—Gerald M. Forlenza
Assistant Examiner—Jerold M. Forsberg
Attorney—John P. Tarlano

[57] ABSTRACT

The present invention relates to a portable kit having an outer shell shaped for mounting on the drive shaft hump of the floor of a motor vehicle. A concave section is formed within the outer shell of said portable kit. A side lid is provided on the side of the kit, above the concave section of the kit. Tie down belt holders are provided on the bottom of the kit in order to further hold the kit within the motor vehicle.

1 Claim, 8 Drawing Figures

Patented April 4, 1972

INVENTOR
PETER M. SELVAGGIO
BY *John P. Sarlano*
HIS ATTORNEY

Patented April 4, 1972

INVENTOR
PETER M. SELVAGGIO

BY John P. Sarlano

HIS ATTORNEY

PORTABLE KIT

BACKGROUND OF THE INVENTION

In the prior art are disclosed various portable kits. These kits are not, however, designed to hold to the drive shaft hump within the interior of a motor vehicle.

The portable kit of the present invention is designed to be held within the interior of a motor vehicle. The portable kit has its bottom concaved so as to fit around the drive shaft hump within the interior of a motor vehicle. The portable kit has a hinged lid above its concave section to allow for access into the interior of the portable kit while it is secured to the drive shaft hump. Tie down belt holders are provided on the portable kit to further secure the kit within the interior of a motor vehicle.

SUMMARY OF THE INVENTION

The present invention relates to a portable kit which may be easily secured to the drive shaft hump within the interior of a motor vehicle, comprising a substantially parallopiped shaped shell having a concave bottom section to fit around the convex driveshaft hump within the interior of a motor vehicle, and a lid which is hinged on the side of said substantially parallopiped shell, the hinge being on the side of said shell above the concave section of the said shell, and tie down belt holders on said shell for tieing the concave section of said portable case against said convex drive shaft hump.

An object of the present invention is to provide a portable kit which may be secured to the drive shaft hump within the interior of a motor vehicle.

Another object of the present invention is to provide a portable kit whose interior is accessible when it is secured to the drive shaft hump within the interior of a motor vehicle.

A further object is to provide a portable kit which may be tied to the drive shaft hump within the interior of a motor vehicle.

DESCRIPTION OF THE PREFERRED EMBODIMENT

Figure 1:
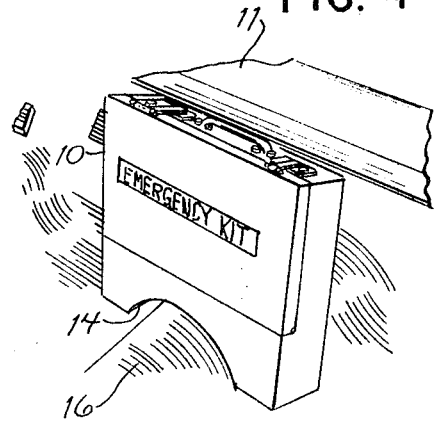
FIG. 1 is a perspective view of the portable kit attached to the drive shaft hump ahead of the front seat of a motor vehicle.

As shown in FIG. 1, a portable kit 10 is held against the dash 11 of a motor vehicle. The kit 10 has a concave bottom section 14 which fits around the convex drive shaft hump 16 of the motor vehicle. The drive shaft hump 16 keeps the kit 10 from moving side ways.

Figures 2, 4:
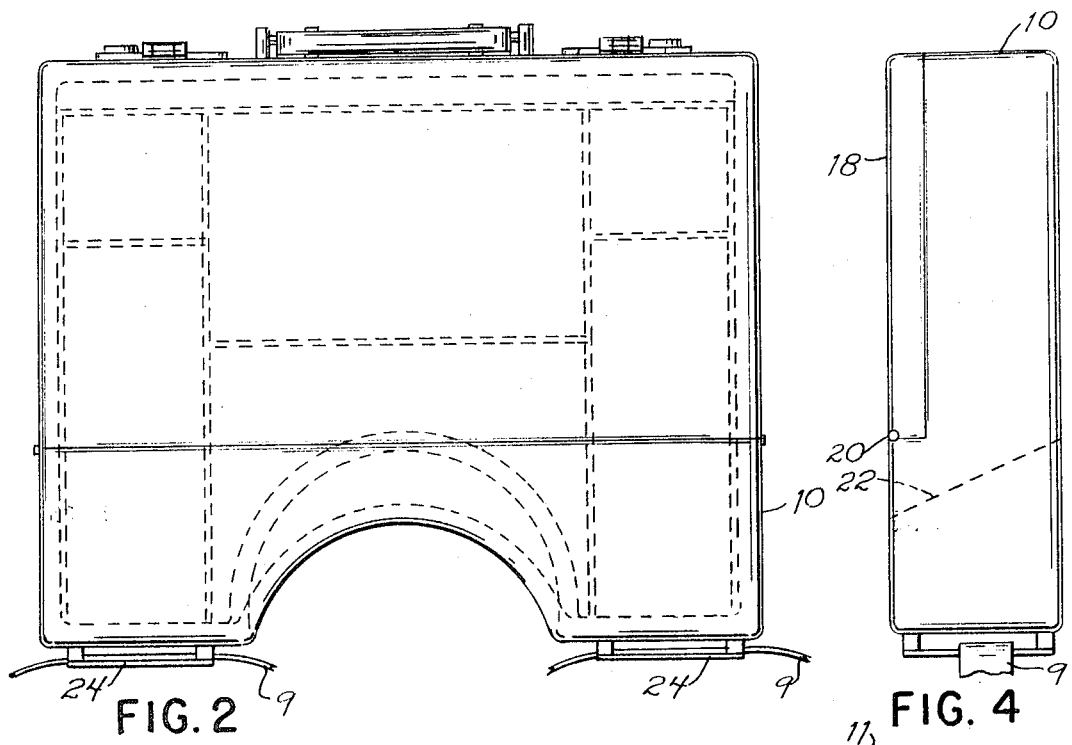
FIG. 2 is a plan view of the side of the portable kit showing its lid and tie down belt holders.
FIG. 4 is a plan view of the side of the portable kit showing its concave section apex.
Figure 3:
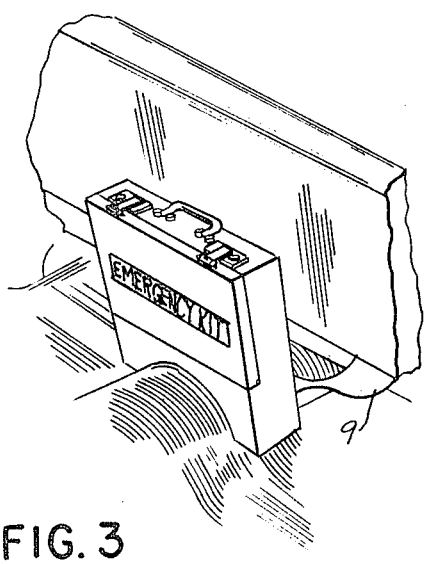
FIG. 3 is a perspective view of the portable kit attached behind the front seat of a motor vehicle.

As shown in FIGS. 2 and 3, the portable kit 10 has tie down belt holders 24 through which safety belts 9 of the motor vehicle may be passed to help keep the portable kit 10 from moving back and forth. Safety belts 9 are placed through the tie down belt holders 24 of the kit 10 to further tie the portable kit within the motor vehicle.

As shown in FIG. 4, the portable kit 10 is opened by rotating a lid 18 around hinges 20 which are above the apex 22 of the concave bottom section 14 of the portable kit 10.

Figure 5:
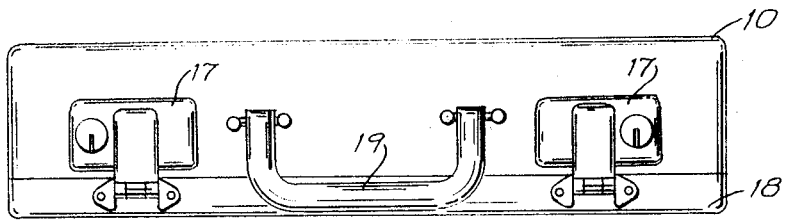
FIG. 5 is a plan view of the top of the portable kit showing its handle.

As shown in FIG. 5, the lid 18 is secured at the top of the portable kit 10 by means of locks 17. The portable kit 10 may be opened when the kit 10 is secured against the dash or front seat of a motor vehicle.

A handle 19 is attached to the top of the portable kit 10 to facilitate carrying the portable kit 10 when it is removed from the drive shaft hump 16.

Figure 6:
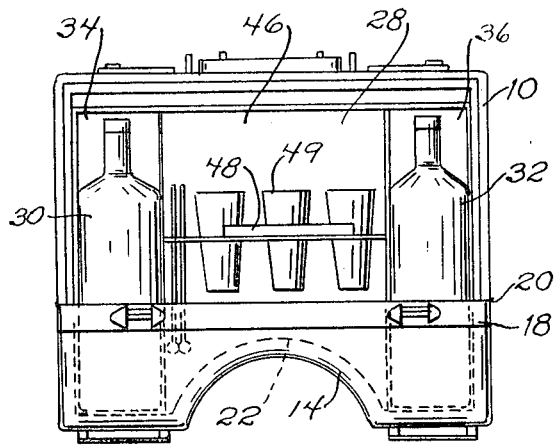
FIG. 6 is a plan view of the interior of the portable beverage kit.

As shown in FIG. 6, the lid 18 of the portable kit 10 is opened around hinges 20 to show the interior 28 of the portable kit 10. Vessels 30 and 32 are held within interior sections 34 and 36 of the portable kit 10. Due to the extensions of the interior sections 34 and 36 below the hinge 20, the vessels 30 and 32 are securely held within the portable kit 10 when the lid 18 of the portable kit 10 is opened. The vessels 30 and 32 extend into the interior sections 34 and 36 which are not fully exposed when the lid 18 is opened.

Figure 7:
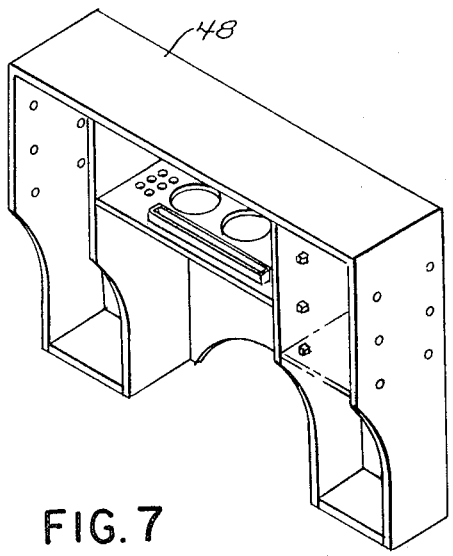
FIG. 7 is a perspective view of the divider used in the portable kit of FIG. 6.

The center section 46 of the portable kit 10, which is at the apex 22 of the concave bottom section 14 of the portable kit 10, is used to hold glasses 49 in a divider which is shown in FIG. 7. The vessels 32 and 34 may be beverage bottles. The portable kit 10 in this embodiment is a portable beverage kit.

Figure 8:
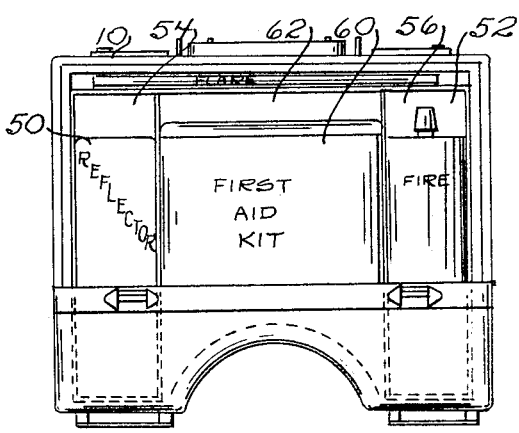
FIG. 8 is a plan view of the interior of a portable emergency kit.

As shown in FIG. 8, the portable kit 10 is designed as a portable emergency kit. A reflector 5 and a fire extinguisher 52 are provided in sections 54 and 52 of the portable emergency kit 10. First aid articles 60 are provided in the center section 62 of the portable emergency kit 10.

What is claimed is:

1. A portable kit which may be secured around the convex drive shaft hump within the interior of a motor vehicle, comprising:
   a. A substantially parallelopiped shaped shell having a central concave bottom section whose apex is tapered rearwardly upward so that said shell may be secured around said convex drive shaft hump;
   b. A flat rectangular hinge-type lid rotatably mounted on the side of said shell above said central concave bottom section for opening downward to expose the interior of said shell when the shell has its central concave bottom section secured around the convex drive shaft hump of said vehicle, and
   c. A divider having a central concave bottom to fit within the interior of said shell for holding items within a predetermined section of the interior of said shell.

* * * * *